United States Patent
Fujita et al.

(10) Patent No.: US 10,365,129 B2
(45) Date of Patent: Jul. 30, 2019

(54) RADIAL LINE DIAL PLATE AND AUTOMOBILE METER PROVIDED WITH RADIAL LINE DIAL PLATE

(71) Applicant: YAZAKI CORPORATION, Tokyo (JP)

(72) Inventors: Sunao Fujita, Shizuoka (JP); Kousuke Sudo, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 465 days.

(21) Appl. No.: 15/136,052

(22) Filed: Apr. 22, 2016

(65) Prior Publication Data

US 2016/0238418 A1     Aug. 18, 2016

Related U.S. Application Data

(63) Continuation of application No. PCT/JP2014/081031, filed on Nov. 25, 2014.

(30) Foreign Application Priority Data

Nov. 26, 2013  (JP) .................................. 2013-243883

(51) Int. Cl.
*G01D 13/12*     (2006.01)
*B60K 37/02*     (2006.01)
(Continued)

(52) U.S. Cl.
CPC ............. *G01D 13/12* (2013.01); *B60K 35/00* (2013.01); *B60K 37/02* (2013.01); *G01D 11/28* (2013.01);
(Continued)

(58) Field of Classification Search
CPC ........ G01D 13/12; G01D 11/28; G01D 13/04; B60K 35/00; B60K 37/02; B60K 2350/402
(Continued)

(56) References Cited

U.S. PATENT DOCUMENTS 2,664,849 A * 1/1954 Nallinger ............... G01D 11/28
116/62.1
3,720,800 A * 3/1973 Arnold ................... H01H 9/165
116/284
(Continued)

FOREIGN PATENT DOCUMENTS

JP     2003-4495 A     1/2003
JP     2006-27546 A    2/2006
(Continued)

OTHER PUBLICATIONS

International Search Report of PCT/JP2014/081031 dated Mar. 3, 2015.

*Primary Examiner* — Justin Seo
*Assistant Examiner* — Tania C Courson
(74) *Attorney, Agent, or Firm* — Sughrue Mion, PLLC (57) ABSTRACT

A radial line dial plate includes a synthetic resin dial plate and a shaft through-hole that is provided to the dial plate such that a rotation shaft of a meter unit penetrates therethrough. The dial plate is provided with a plurality of grooves that extend radially outward from an opening rim of the shaft through-hole to form a radial line pattern provided on the dial plate, and the plurality of grooves are provided radially around a position different from a center axis of the shaft through-hole. Thus, there are provided a radial line dial plate and an automobile meter provided with the radial line
(Continued)

dial plate in which the radial line pattern of appearance with comfortable and natural feeling as a metallic-tone dial plate can be stably given.

8 Claims, 6 Drawing Sheets

(51) Int. Cl.
  *G01D 11/28* (2006.01)
  *B60K 35/00* (2006.01)
  *G01D 13/04* (2006.01)
(52) U.S. Cl.
  CPC ........ *G01D 13/04* (2013.01); *B60K 2370/695* (2019.05)
(58) Field of Classification Search
  USPC ....... 116/28 R, 49, 62.1, 284, 286, 287, 288, 116/298, 302, 305; 362/23, 26; 340/815.53, 815.73, 870.02, 870.03
  See application file for complete search history.

(56) References Cited

U.S. PATENT DOCUMENTS

| | | | | |
|---|---|---|---|---|
| 3,890,716 A * | 6/1975 | Hatch | ................... | G01D 13/10 116/298 |
| 4,991,064 A * | 2/1991 | Clem | ................... | G01D 11/28 116/286 |
| 5,261,349 A * | 11/1993 | Iino | ................... | B60K 35/00 116/289 |
| 6,054,932 A * | 4/2000 | Gartner | ................... | G08G 1/095 340/815.45 |
| 6,753,068 B2 * | 6/2004 | Nakamura | ................... | B44C 1/222 428/142 |
| 6,755,546 B2 * | 6/2004 | Ohkawa | ................... | G01D 11/28 362/23.15 |
| 6,802,276 B2 * | 10/2004 | Sugimoto | ................... | B60K 37/02 116/286 |
| 6,904,866 B2 * | 6/2005 | Furuya | ................... | G01D 11/28 116/286 |
| 7,357,096 B2 * | 4/2008 | Tane | ................... | G01D 11/28 116/288 |
| 8,025,951 B2 * | 9/2011 | Bourban | ................... | G04B 19/10 428/172 |
| 8,065,973 B2 * | 11/2011 | Suzuki | ................... | G01D 11/28 116/46 |
| 8,243,556 B2 * | 8/2012 | Yamaguchi | ................... | G04C 10/02 368/205 |
| 9,574,913 B2 * | 2/2017 | Mochizuki | ................... | G01D 13/18 |
| 9,738,157 B1 * | 8/2017 | Hattori | ................... | B60K 35/00 |
| 9,771,031 B2 * | 9/2017 | Hattori | ................... | B60K 35/00 |
| 9,983,347 B2 * | 5/2018 | Fujita | ................... | G02B 6/006 |
| 10,006,788 B2 * | 6/2018 | Fujita | ................... | B60K 35/00 |
| 10,048,099 B2 * | 8/2018 | Hattori et al. | ......... | B60K 35/00 |
| 10,072,816 B2 * | 9/2018 | Shen | ................... | B29D 11/0074 |
| 2002/0189526 A1 * | 12/2002 | Sugimoto | ................... | B60K 37/02 116/286 |
| 2003/0121467 A1 * | 7/2003 | Furuya | ................... | G01D 11/28 116/286 |
| 2004/0108048 A1 * | 6/2004 | Nakakuki | ................... | B44C 1/1729 156/230 |
| 2005/0024754 A1 * | 2/2005 | Epstein | ................... | G02B 5/021 359/831 |
| 2006/0018109 A1 * | 1/2006 | Kageyama | ................... | B60K 37/02 362/23.01 |
| 2007/0089665 A1 * | 4/2007 | Suzuki | ................... | G01D 11/28 116/245 |
| 2008/0159083 A1 * | 7/2008 | Kawakami | ................... | G04B 19/12 368/232 |
| 2008/0213546 A1 * | 9/2008 | Murata | ................... | B05D 5/02 428/195.1 |
| 2009/0160090 A1 * | 6/2009 | Suzuki | ................... | G01D 11/28 264/293 |
| 2010/0046103 A1 * | 2/2010 | Yeh | ................... | G02B 5/201 359/831 |
| 2011/0308445 A1 * | 12/2011 | Avda | ................... | G04B 19/04 116/201 |
| 2012/0140604 A1 * | 6/2012 | Kawakami | ................... | G04B 19/06 368/276 |
| 2012/0141818 A1 * | 6/2012 | Kajiwara | ................... | H01L 21/56 428/610 |
| 2012/0155225 A1 * | 6/2012 | Takasawa | ................... | G04B 19/12 368/223 |
| 2013/0040090 A1 * | 2/2013 | Sakurai | ................... | B60K 35/00 428/66.6 |
| 2015/0151678 A1 * | 6/2015 | Birman | ................... | G01D 13/02 362/23.01 |
| 2016/0185034 A1 * | 6/2016 | Sano | ................... | G01D 13/04 264/496 |
| 2016/0252373 A1 * | 9/2016 | Fujita | ................... | G01D 13/04 116/334 |
| 2016/0263698 A1 * | 9/2016 | Noirot | ................ | B23K 26/0006 |
| 2017/0072800 A1 * | 3/2017 | Fujita | ................... | B60K 35/00 |
| 2017/0282716 A1 * | 10/2017 | Mochizuki | ................... | B60Q 3/14 |
| 2018/0268594 A1 * | 9/2018 | Shoji | ................... | G06T 13/80 |

FOREIGN PATENT DOCUMENTS

| | | |
|---|---|---|
| JP | 2007-249028 A | 9/2007 |
| JP | 2009-42001 A | 2/2009 |
| JP | 4543046 B2 | 9/2010 |

\* cited by examiner

RADIAL LINE DIAL PLATE AND AUTOMOBILE METER PROVIDED WITH RADIAL LINE DIAL PLATE

CROSS-REFERENCE TO RELATED APPLICATION

This application is a continuation application of International Application PCT/JP2014/081031, filed on Nov. 25, 2014, and designating the U.S., the entire contents of which are incorporated herein by reference.

BACKGROUND OF THE INVENTION

1. Field of the Invention

The present invention relates to a radial line dial plate and an automobile meter provided with the radial line dial plate.

2. Description of the Related Art

There is known an automobile meter which has high-grade feeling in such a manner that a radial line pattern is formed by a plurality of grooves extending radially on some flat surface of a dial plate used in vehicle meters or the like.

For example, a dial plate used in meter devices disclosed in Japanese Patent Application Laid-open No. 2003-4495 is applied with radial line marks made up of a plurality of grooves extending radially from the center of a disk-shaped plate member made of a metal (see paragraphs [0035] and [0040] in the same literature).

In the dial plate made of the metal, however, radial line mark treatment is required to be performed for each sheet of metal plates by a brush, and there are problems in terms of obtaining a uniform quality and in terms of manufacturing costs. In addition, since the dial plate is made of the metal, it is heavy in weight, which is disadvantageous to weight reduction in vehicle, especially.

Therefore, as in display devices or pointer instruments for vehicle disclosed in Japanese Patent Application Laid-open No. 2006-27546 and Japanese Patent Application Laid-open No. 2009-42001, a metallic-tone dial plate has been proposed in which metallic feeling is created using a synthetic resin. Even on the surface of such a metallic-tone dial plate, a radial line pattern is formed which is made up of a plurality of grooves extending radially from a center position corresponding to a rotation center of a pointer of the display device.

Figure 8A:
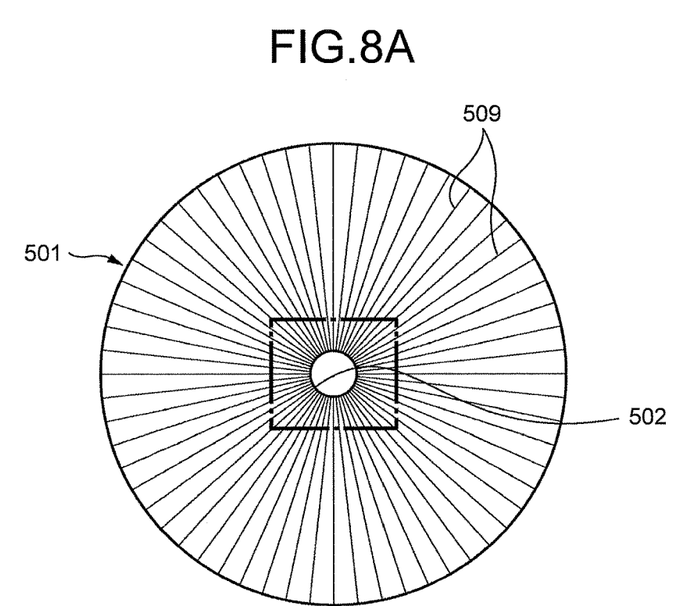
FIG. 8A is a diagram illustrating a conventional radial line dial plate.
Figure 8B:
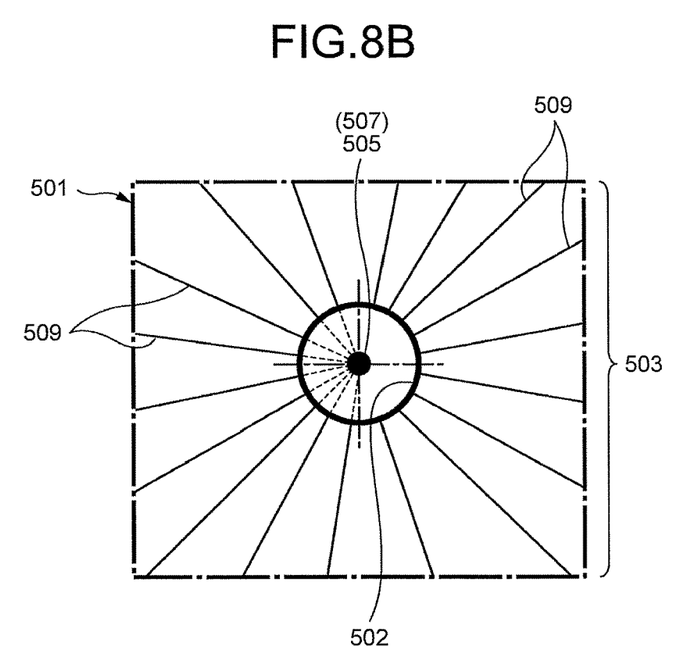
FIG. 8B is an enlarged view of a main part in a line surrounded by one-dot chain line in FIG. 8A.

However, as in a metallic-tone dial plate illustrated in FIGS. 8A and 8B, a radial line dial plate 501 made of a synthetic resin is configured such that a center 505 of a radial line pattern 503 formed on the surface of the radial line dial plate 501 substantially coincides with a center 507 of a shaft through-hole 502 in an indicator such as a speedometer or a fuel gauge. That is, all of grooves 509 are directed toward the center 507 of the shaft through-hole 502. Therefore, there are problems that the radial line pattern 503 looked non-random and thus uncomfortable feeling occurred in appearance.

Since fine lines such as hairs are linearly given in a hair line process for applying radial line marks to the metal plate, these lines generally intersect with each other. For example, hairline marking is performed on the metal plate when a brush (having a width of about 2 mm) for marking hairlines is stroked while the dial plate is slightly rotated. Accordingly, the stroke mark having a width intersects with a portion of the stroke marks adjacent to each other. In contrast, since the radial line pattern 503 in the radial line dial plate 501 made of the synthetic resin is formed by transferring of a plurality of grooves, which are cut in a molding die and extend radially around one point, to the surface, the radial lines do not intersect with each other. This is considered to cause uncomfortable feeling to metallic feeling of the radial line dial plate 501 made of the synthetic resin.

SUMMARY OF THE INVENTION

In view of the circumstances described above, the present invention aims to provide a radial line dial plate and an automobile meter provided with the radial line dial plate stably given a radial line pattern of appearance with comfortable and natural feeling as a metallic-tone dial plate.

To achieve the above-described objective, a radial line dial plate according to one aspect of the present invention includes a dial plate made of synthetic resin; and a shaft through-hole configured to be provided to the dial plate such that a rotation shaft of a meter unit penetrates therethrough, wherein the dial plate is provided with a plurality of grooves that extend radially outward from an opening rim of the shaft through-hole to form a radial line pattern provided on the dial plate, and the plurality of grooves are configured to be provided radially around a position different from a center axis of the shaft through-hole.

A radial line dial plate according to another aspect of the present invention includes a dial plate made of synthetic resin; and a shaft through-hole configured to be provided to the dial plate such that a rotation shaft of a meter unit penetrates therethrough, wherein the dial plate is provided with a plurality of grooves that extend outward from an opening rim of the shaft through-hole to form a radial line pattern provided on the dial plate, and at least several grooves of the plurality of grooves are configured to be provided to intersect with other groove.

A radial line dial plate according to still another aspect of the present invention includes a dial plate made of synthetic resin; and a shaft through-hole configured to be provided to the dial plate such that a rotation shaft of a meter unit penetrates therethrough, wherein the dial plate is provided with a plurality of grooves that extend outward from an opening rim of the shaft through-hole to form a radial line pattern provided on the dial plate, and the plurality of grooves are configured to include first grooves that are provided radially around a center axis of the shaft through-hole and second grooves that are provided along a straight line not passing through the center axis.

A radial line dial plate according to still another aspect of the present invention includes a dial plate made of synthetic resin; and a shaft through-hole configured to be provided to the dial plate such that a rotation shaft of a meter unit penetrates therethrough, wherein the dial plate is provided with a plurality of grooves that extend outward from an opening rim of the shaft through-hole to form a radial line pattern provided on the dial plate, and the plurality of grooves are configured to include first grooves that are provided radially around a position different from a center axis of the shaft through-hole and second grooves that are provided along a straight line not passing through the center axis.

According to still another aspect of the present invention, an automobile meter includes the radial line dial plate.

The present invention has been described above in brief. Further, the details of the present invention will become more apparent by reading through a mode for carrying out the invention (hereinafter, referred to as an "embodiment") to be described below with reference to the accompanying drawings.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments according to the present invention will be described below with reference to the accompanying drawings.

Figure 1:
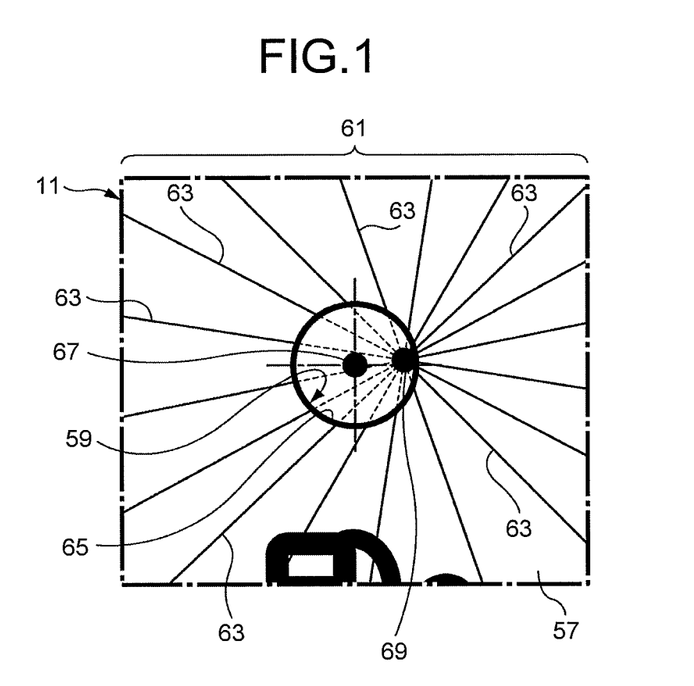
FIG. 1 is an enlarged view illustrating a main part of a D-portion, which is a radial line dial plate according to a first embodiment of the present invention, illustrated in FIG. 2B.
Figure 2A:
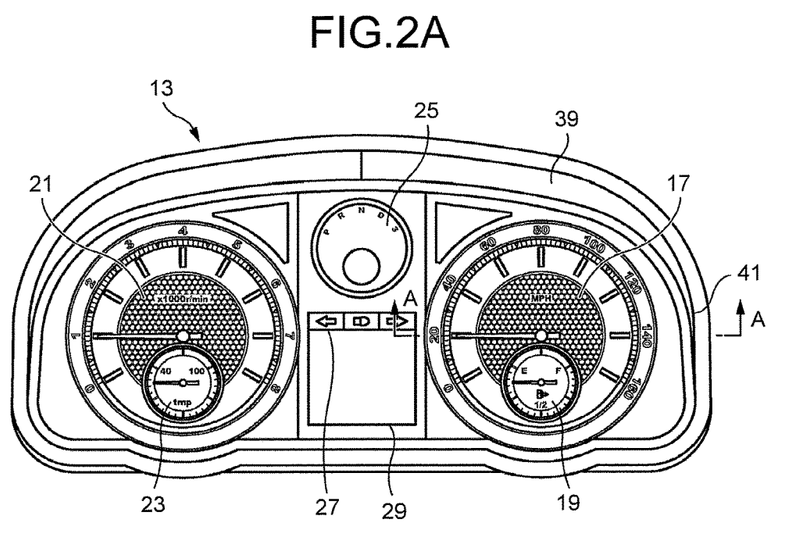
FIG. 2A is a front view of a vehicle combination meter in which the radial line dial plate illustrated in FIG. 1 is used.
Figure 2B:
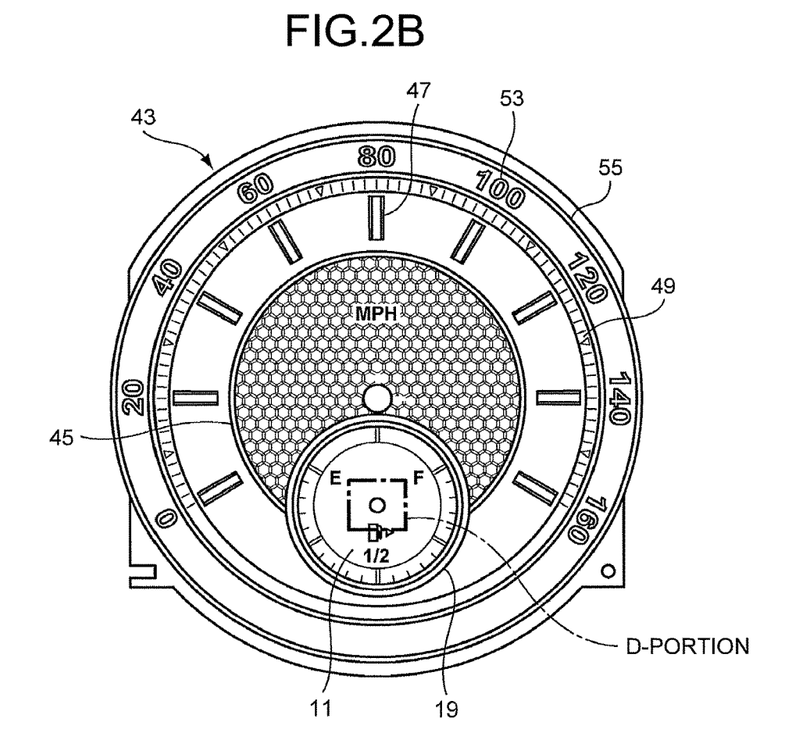
FIG. 2B is an enlarged view of a speedometer illustrated in FIG. 2A.

A radial line dial plate 11 according to a first embodiment of the present invention illustrated in FIG. 1 can be used in a vehicle combination meter 13 illustrated in FIGS. 2A and 2B, for example.

Figure 3:
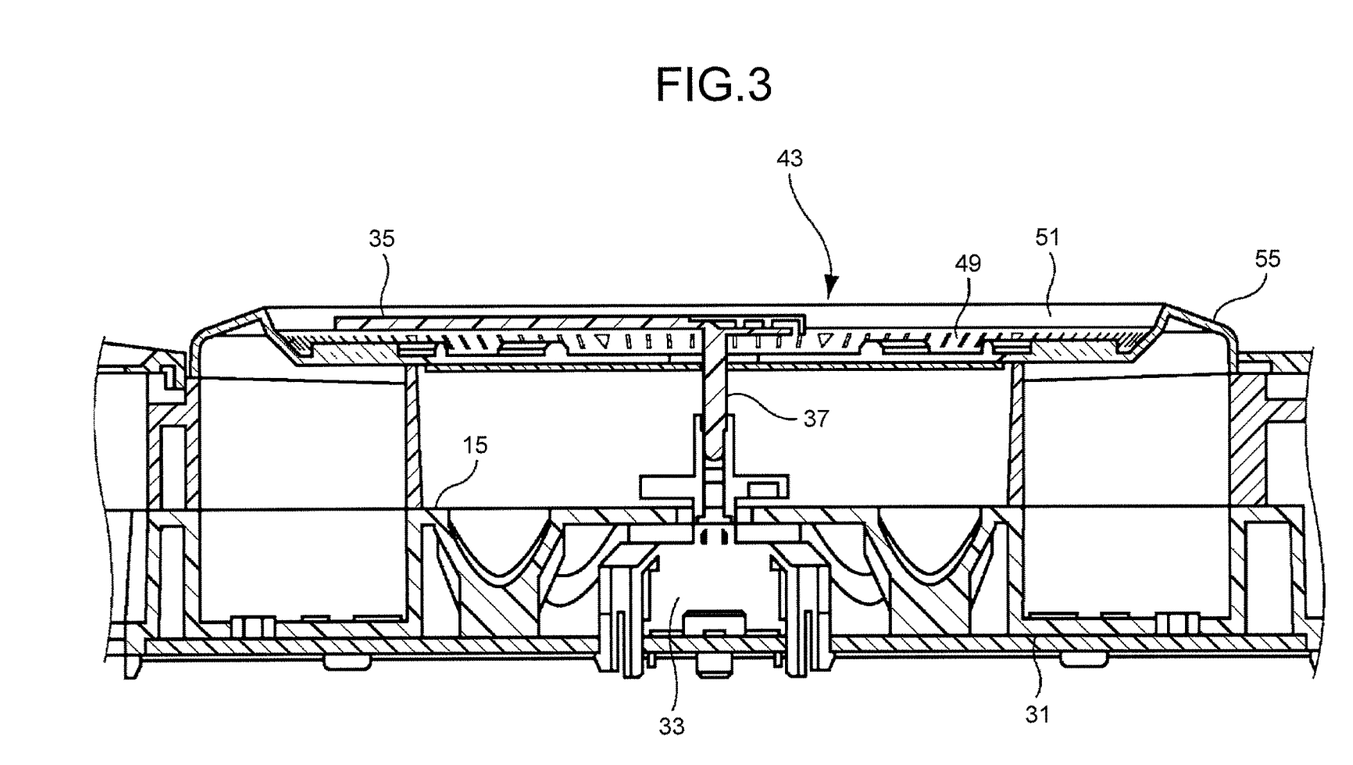
FIG. 3 is a cross-sectional view taken along line A-A in FIG. 2A.

The vehicle combination meter 13 includes a case 15 (see FIG. 3), a speedometer 17, a fuel gauge 19, a tachometer 21, a water temperature gauge 23, a shift display portion 25, a turn display portion 27, and a multi-display portion 29. As illustrated in FIG. 3, for example, an inner mechanism (meter unit) 33 of the speedometer 17 and the tachometer 21 are fixed to a wiring board 31. The vehicle combination meter 13 is configured in such a manner that a rotation shaft 37 of a pointer 35 is projected into the inner mechanism 33. The vehicle combination meter 13 is configured in such a manner that a facing member 39 is attached to the case 15 and the facing member 39 covers, for example, the wiring board 31 or the inner mechanism 33 such that above-described various types of meters are exposed from an opening. A front side of the facing member 39 is further covered by a transparent cover 41 attached to the case 15.

The speedometer 17 and the tachometer 21 have a resin substrate body 43 illustrated in FIG. 3. As illustrated in, for example, FIGS. 2B and 3, the resin substrate body 43 has an annular ring-shaped region that is continuously provided at the outside of a disk-shaped central disk portion 45 through which a shaft hole is bored. The resin substrate body 43 has mark protrusions 47 that protrude at predetermined intervals in a circumferential direction of the annular region. The resin substrate body 43 is transparent and acts as a light guide plate. Guided light is emitted from a protruding end face of the mark protrusion 47. The outside of the annular region becomes a marked inclination plane 49. The resin substrate body 43 is configured in such a manner that a ring-shaped frame wall portion 51 with steep slope is continuously provided at the outside of the marked inclination plane 49. The resin substrate body 43 is configured in such a manner that an inverse inclination plane, which is inclined downward to the outside, is continuously provided at the further outside of the frame wall portion 51. The inverse inclination plane becomes a peripheral dial plate 55 that is provided with speed characters 53 at predetermined intervals.

The radial line dial plate 11 according to the first embodiment is used in the water temperature gauge 23 and the fuel gauge 19 which are automobile meters in the vehicle combination meter 13. An example of the radial line dial plate used in the fuel gauge 19 will be described below for each embodiment.

As illustrated in FIG. 1, the radial line dial plate 11 according to the first embodiment includes a synthetic resin dial plate 57 that is integrally molded into a disk shape by a molding die (not illustrated) and a shaft through-hole 59 that is provided in the dial plate 57 such that a rotation shaft of an inner mechanism (meter unit, not illustrated) in the fuel gauge 19 penetrates therethrough. The radial line dial plate 11 includes a plurality of grooves 63 that are provided in the dial plate 57 to form a radial line pattern 61.

The grooves 63 illustrated in FIG. 1 are largely exaggerated. The grooves 63 are actually very small in width, depth, and interval, and are difficult to be visually recognized. Many of the grooves 63 are formed in the dial plate 57 compared to the example illustrated in FIG. 1. The plurality of grooves 63, which form the radial line pattern 61 provided on the dial plate 57, are typically formed at the side that is visually recognized by, for example, a driver of the vehicle applied with the vehicle combination meter 13, in other words, at a passenger compartment side of the vehicle (dial plates 73, 85, and 95, and grooves 77, 79, 81, 89, and 91 to be described below also have substantially the same configuration).

Here, with reference to FIG. 4, the description will be made with respect to an example of a configuration of the plurality of grooves 63 that form the radial line pattern 61 provided on the dial plate 57 (dial plates 73, 85, and 95, and grooves 77, 79, 81, 89, and 91 to be described below also have substantially the same configuration).

Figure 4:
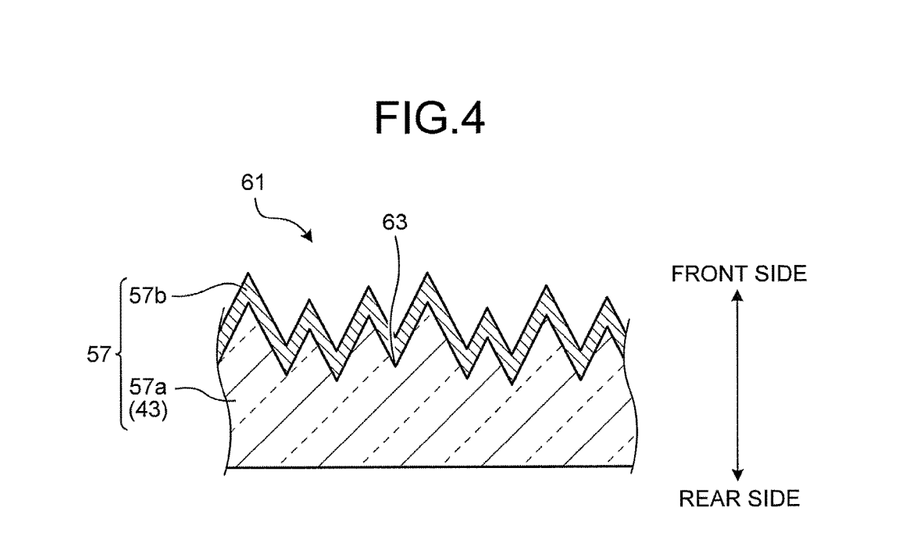
FIG. 4 is a cross-sectional view for schematically explaining an example of a groove forming a radial line pattern of a radial line dial plate.

The dial plate 57 illustrated in FIG. 4 is configured to include at least a two-layered structure of a resin substrate (substrate body) 57a made of a synthetic resin and a metal thin film 57b. The dial plate 57 includes the plurality of grooves 63 that are provided on a front face of the resin substrate 57a and form the radial line pattern 61. On the resin substrate 57a, the plurality of grooves 63 are integrally molded by the molding die or the like to form the radial line pattern 61 as described below. Here, this embodiment describes that the light transmissive resin substrate body 43 made of a transparent synthetic resin (for example, an acrylic resin or polycarbonate) is used as the resin substrate 57a, but the resin substrate 57a may be formed separately from the resin substrate body 43 without being limited thereto. With respect to the plurality of grooves 63, the grooves are preferably random in depth, but are not limited thereto. Then, the dial plate 57 includes the metal thin film 57b applied on the front face of the resin substrate 57a provided with the grooves 63. The metal thin film 57b is deposited at least in a region including the plurality of grooves 63, which form the radial line pattern 61 provided on the front face of the resin substrate 57a in a state where the unevenness of the grooves 63 remains, to form a reflective surface. The metal thin film 57b is deposited on the front face of the resin substrate 57a by, for example, sputtering, vapor deposition, plating, painting, or printing. Here, the front face of the resin substrate 57a corresponds to a face of the dial plate 57 that is visually recognized by a driver or the like of the vehicle applied with the vehicle combination meter 13, in other words, a face located at a passenger compartment side of the vehicle.

In the first embodiment, the grooves 63 are provided radially around a position different from a center axis 67 of the shaft through-hole 59 and extend radially from an opening rim 65 of the shaft through-hole 59 to the outside. These many grooves 63 form the radial line pattern 61. That is, the center of the position different from the center axis 67 of the shaft through-hole 59 becomes a radiation center 69 of the radial line pattern 61. Many grooves 63 are integrally molded in such a manner of being transferred to a molding face of the resin substrate (the front face of the resin substrate 57a in the above-described dial plate 57) constituting the dial plate 57 from a die mark-molding-face of a molding die (not illustrated), for example.

Then, a plurality of molding dies are manufactured for each production base to mold the radial line dial plate 11. At this time, processing information of manufacturing the molding die is stored in a processing machine as common processing data. As the processing machine, for example, NC (Numerical Control) milling machine can be used. The processing data is obtained by digitization of, for example, a position of a die material or movement of a main shaft. Thus, the grooves 63 are formed in the dial plate 57 in a uniform shape even when being transferred from the die mark-molding-face of any molding die.

The dial plate 57 of the radial line dial plate 11 is molded using a flowable synthetic resin excellent in transferability. As the synthetic resin excellent in transferability, a thermoplastic resin such as a cycloolefin polymer (COP) resin can be suitably used. Thus, the radial line pattern formed on the die mark-molding-face can be faithfully transferred to the radial line pattern 61 of the dial plate 57 by the synthetic resin forming the dial plate 57.

The radial line pattern 61 may be obtained by in-mold molding. In the in-mold molding, a transfer sheet is disposed in a die and thus the radial line pattern 61 is formed. A decorated transfer sheet is sent into the die of an injection molding by a feeding unit, and is transferred to a resin molding face (the front face of the resin substrate 57a in the above-described dial plate 57). Since the in-mold molding has a small number of steps in process and thus automatically performs the process at a high speed, it is suitable for mass production of molded products. Naturally, mark processing information of the transfer sheet to be used herein is common.

Then, operation of the radial line dial plate 11 having the above-described configuration will be described.

According to the radial line dial plate 11 of this first embodiment, the center axis 67 of the shaft through-hole 59 dose not coincide with the center (radiation center 69) of the radial line pattern 61. The dial plate 57 has a circular profile. Since the center of the dial plate 57 is the center axis 67, the radiation center 69 deviates from the center axis 67, and thus is appeared that the radial line pattern 61 is biased (that is, eccentric) with respect to the profile of the dial plate 57. For this reason, in the radial line dial plate 11, the relevance of the dial plate 57 and the radial line pattern 61 is eliminated. Thus, according to the radial line dial plate 11, it is possible to stably manufacture the radial line dial plate 11 having the radial line pattern 61, which is a metallic-tone dial plate, of appearance with comfortable and natural feeling.

A radial line dial plate 71 according to a second embodiment of the present invention will be described below.

Figure 5:
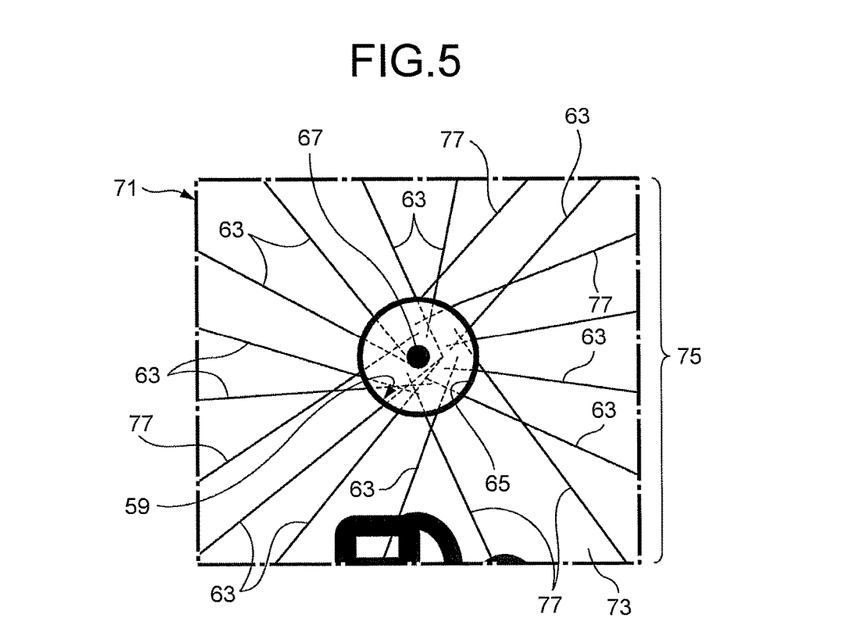
FIG. 5 is an enlarged view illustrating a main part of a radial line dial plate according to a second embodiment of the present invention.

With respect to the radial line dial plate 71 according to the second embodiment as illustrated in FIG. 5, members and portions that are the same as those of the radial line dial plate 11 according to the first embodiment illustrated in FIGS. 1 to 4 are denoted by the same reference numerals, and are not described.

The radial line dial plate 71 according to the second embodiment includes a synthetic resin dial plate 73 that is integrally molded into a disk shape by a molding die (not illustrated) and a shaft through-hole 59 that is provided in the dial plate 73 such that a rotation shaft of a fuel gauge 19 penetrates therethrough. The radial line dial plate 71 includes a plurality of grooves 63 that are provided on the dial plate 73 such that at least several grooves 63 intersect with other grooves (intersecting grooves 77), the plurality of grooves 63 being provided on the dial plate 73 so as to extend outward from an opening rim 65 of the shaft through-hole 59, thereby forming a radial line pattern 75.

In the radial line dial plate 71 according to the second embodiment, the shaft through-hole 59 is bored through the center of the dial plate 73 having a circular profile. In the radial line dial plate 71, the plurality of grooves 63 are formed in a straight shape on the dial plate 73 such that at least one end thereof comes in contact with the shaft through-hole 59, thereby forming the radial line pattern 75. That is, the radial line pattern 75 formed in such a manner that one end of the groove comes in contact with the shaft through-hole 59 becomes substantially a radial line pattern that is slightly rough (random) compared to a radial line pattern in such a manner that grooves radially pass through a center axis 67 of the shaft through-hole 59. This is because radiation points are not constant.

In addition, the radial line dial plate 71 is configured such that at least several grooves 63 of numerous grooves 63 intersect with other grooves (intersecting grooves 77) in the dial plate 73, the numerous grooves 63 coming in contact with such a shaft through-hole 59 to from substantially the radial line pattern. That is, the intersecting grooves 77 pass through the shaft through-hole 59, and intersect with at least one groove 63. The intersecting grooves 77 may be intersect with the plurality of grooves 63. In this way, according to the dial plate 73 of this configuration, ordering is moderately eliminated because the radial line pattern 75 is slightly rough and at least several grooves 63 intersect with the intersecting grooves 77 as well. Thus, according to the radial line dial plate 71, it is possible to obtain the radial line dial plate 71 having the radial line pattern 75 of appearance with comfortable and natural feeling.

A radial line dial plate 83 according to a third embodiment of the present invention will be described below.

Figure 6:
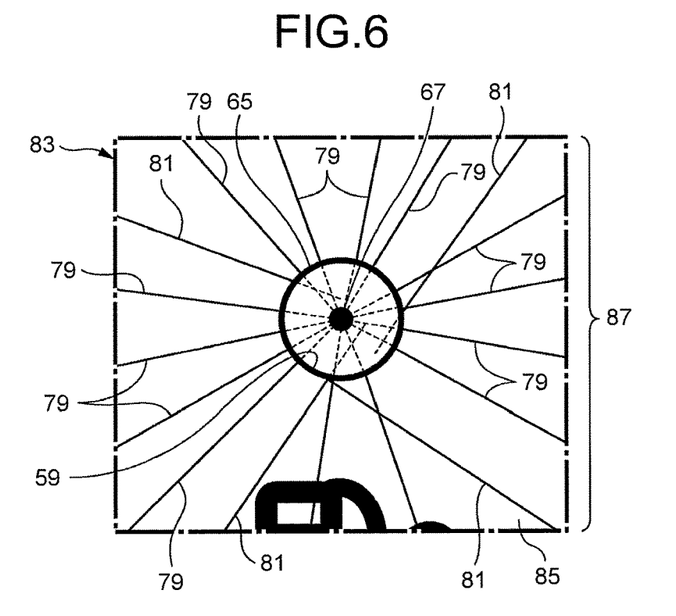
FIG. 6 is an enlarged view illustrating a main part of a radial line dial plate according to a third embodiment of the present invention.

The radial line dial plate 83 according to the third embodiment as illustrated in FIG. 6 includes a synthetic resin dial plate 85 that is integrally molded into a disk shape by a molding die (not illustrated) and a shaft through-hole 59 that is provided in the dial plate 85 such that a rotation shaft of a fuel gauge 19 penetrates therethrough. The radial line dial plate 83 includes a plurality of grooves that are provided on the dial plate 85 so as to extend outward from an opening rim 65 of the shaft through-hole 59, thereby forming a radial line pattern 87, the plurality of grooves include first grooves 79 that are radially provided around a center axis 67 of the shaft through-hole 59 and second grooves 81 that are provided along a straight line not passing through the center axis 67.

According to the radial line dial plate 83 of the third embodiment, the radial line dial plate 83 includes the first grooves 79 that are provided radially around the center axis 67 on the dial plate 85, thereby forming the radial line pattern 87. In addition, the radial line dial plate 83 includes the second grooves 81 that are formed on the dial plate 85 so as to extend outward from the opening rim 65 of the shaft through-hole 59 without passing through the center axis 67. Accordingly, the second grooves 81 can intersect with the first grooves 79. The radial line dial plate 83 is given in such a manner that on the dial plate 85 the radial line pattern 87 provided orderly in a radiation direction around the center axis 67 is overlapped with the substantial radial line pattern, which is slightly rough and is formed by the second grooves 81 extending outward from the opening rim 65. In this way, since the slightly rough substantial radial line pattern can be overlapped with the radial line pattern 87, ordering of the dial plate 85 according to the configuration is moderately eliminated. Thus, according to the radial line dial plate 83, it is possible to obtain the radial line dial plate 83 having the radial line pattern 87 of appearance with comfortable and natural feeling.

A radial line dial plate 93 according to a fourth embodiment of the present invention will be described below.

Figure 7:
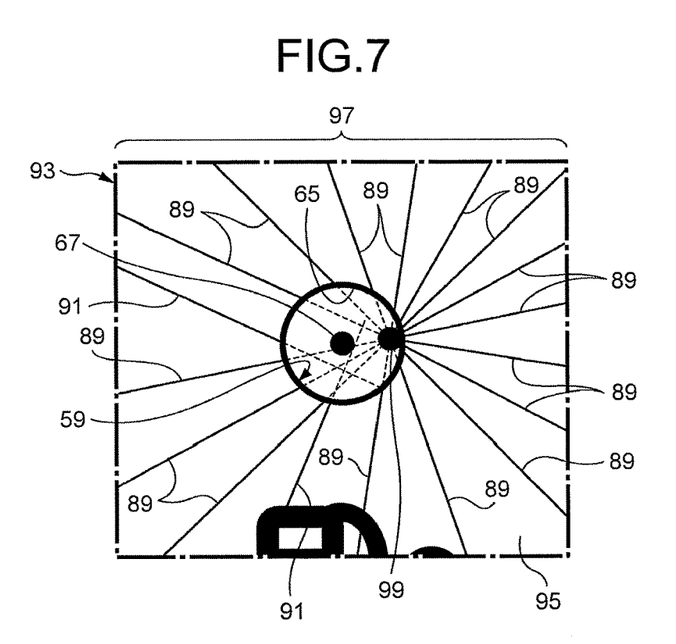
FIG. 7 is an enlarged view illustrating a main part of a radial line dial plate according to a fourth embodiment of the present invention.

The radial line dial plate 93 according to the fourth embodiment as illustrated in FIG. 7 includes a synthetic resin dial plate 95 that is integrally molded into a disk shape by a molding die (not illustrated) and a shaft through-hole 59 that is provided in the dial plate 95 such that a rotation shaft 37 of a fuel gauge 19 penetrates therethrough. A plurality of grooves are provided on the dial plate 95 so as to extend outward from an opening rim 65 of the shaft through-hole 59, thereby forming a radial line pattern 97, the plurality of grooves include first grooves 89 that are radially provided around a position (the other center 99) different from a center axis 67 of the shaft through-hole 59 and second grooves 91 that are provided along a straight line not passing through the other center 99.

According to the radial line dial plate 93 of the fourth embodiment, the radial line dial plate 93 includes a radial line pattern 97 that is formed on the dial plate 95 by the plurality of grooves extending outward from the opening rim 65. Out of these grooves, the first grooves 89 are provided radially from the other center 99 different from the center axis 67. The other center 99 can be provided inside the shaft through-hole 59, for example. In addition, the second grooves 91 do not pass through the other center 99. Therefore, the radial line dial plate 93 is appeared that radial line pattern 97 is biased (eccentric) with respect to the profile of the dial plate 95, and relevance of the dial plate 95 and the radial line pattern 97 is eliminated. In addition to this, ordering of the eccentric radial line pattern in the radial line dial plate 93 is more moderately eliminated because the second grooves 91 do not pass through the other center 99 of the radial line pattern 97. Thus, according to the radial line dial plate 93, it is possible to obtain the radial line dial plate 93 having the radial line pattern 97 of appearance with comfortable and natural feeling.

Therefore, it is possible to obtain the fuel gauge 19 having high-grade feeling as the automobile meter without causing uncomfortable feeling to metallic feeling of the radial line dial plates 11, 71, 83, and 93 made of the synthetic resin.

The features of the above-described radial line dial plate and the automobile meter provided with the radial line dial plate according to the present invention will be concisely summarized below:

[1] A radial line dial plate 11 including a synthetic resin dial plate 57 and a shaft through-hole 59 that is provided in the dial plate 57 such that a rotation shaft 37 of a meter unit (inner mechanism) penetrates therethrough, wherein the dial plate 57 is provided with a plurality of grooves 63 that extend radially outward from an opening rim 65 of the shaft through-hole 59 to form a radial line pattern 61 provided on the dial plate 57, and the plurality of grooves 63 are provided radially around a position different from a center axis 67 of the shaft through-hole 59 as the center (radiation center) 69.

[2] A radial line dial plate 71 including a synthetic resin dial plate 73 and a shaft through-hole 59 that is provided in the dial plate 73 such that a rotation shaft 37 of a meter unit (inner mechanism) penetrates therethrough, wherein the dial plate 73 is provided with a plurality of grooves 63 that extend outward from an opening rim 65 of the shaft through-hole 59 to form a radial line pattern 75 provided on the dial plate 73, and at least several grooves 63 of the plurality of grooves 63 are provided to intersect with other grooves (intersecting grooves) 77.

[3] A radial line dial plate 83 including a synthetic resin dial plate 85 and a shaft through-hole 59 that is provided in the dial plate 85 such that a rotation shaft 37 of a meter unit (inner mechanism) penetrates therethrough, wherein the dial plate 85 is provided with a plurality of grooves that extend outward from an opening rim 65 of the shaft through-hole 59 to form a radial line pattern 87 provided on the dial plate 85, and the plurality of grooves include first grooves 79 that are provided radially around a center axis 67 of the shaft through-hole 59 and second grooves 81 that are provided along a straight line not passing through the center axis 67.

[4] A radial line dial plate 93 including a synthetic resin dial plate 95 and a shaft through-hole 59 that is provided in the dial plate 95 such that a rotation shaft 37 of a meter unit (inner mechanism) penetrates therethrough, wherein the dial plate 95 is provided with a plurality of grooves that extend outward from an opening rim 65 of the shaft through-hole 59 to form a radial line pattern 97 provided on the dial plate 95, and the plurality of grooves include first grooves 89 that are provided radially around a position of the other center (center) 99 different from a center axis 67 of the shaft through-hole 59 and second grooves 91 that are provided along a straight line not passing through the other center 99.

[5] An automobile meter (fuel gauge) 19 including the radial line dial plate 11, 71, 83, or 93 according to any one configuration of the above-described features [1] to [4].

Therefore, according to the radial line dial plate 11, the radial line dial plate 71, the radial line dial plate 83, the radial line dial plate 93, and the fuel gauge 19 as the automobile meter provided with these components of the present embodiment, the radial line pattern of appearance with comfortable and natural feeling as a metallic-tone dial plate can be stably given.

The present invention is not limited to the above-described embodiment, and various changes, modifications, or the like can be made as appropriate. Moreover, the material, shape, dimensions, number, location, and the like of each constituent element in the above-described embodiment are optional and no limitations are imposed on them as long as the invention can be implemented.

The plurality of grooves 63, 77, 79, 81, 89, and 91 are not limited to the configuration described with reference to FIG. 4.

The dial plate 57, 73, 85, or 95 (hereinafter, the "dial plate 57" will be described as an example) may be configured to include a two-layered structure of, for example, a transparent resin substrate (substrate body) made of a synthetic resin (for example, an acrylic resin or a polycarbonate) having at least light transmissive and an ink layer. The ink layer is applied to the resin substrate by, for example, printing. In this case, the dial plate 57 may include the plurality of grooves 63, 77, 79, 81, 89, and 91 (hereinafter, the "groove 63" will be simply described as an example) that are provided on the front face of the resin substrate and form the radial line patterns 61, 75, 87, or 97 (hereinafter, the "radial line pattern 61" will be simply described as an example), and may include a plurality of grooves 63 that are provided on a rear face of the resin substrate and form the radial line pattern 61. Here, as described above, the front face of the resin substrate corresponds to the face of the resin substrate that is visually recognized by the driver or the like, in other words, the face located at the passenger compartment side of the vehicle. Meanwhile, the rear face of the resin substrate corresponds to a face located at a side opposite to the side that is visually recognized by the driver or the like, in other words, a face located at a side opposite to the passenger compartment side of the vehicle.

When the dial plate 57 includes the plurality of grooves 63 that are provided on the front face of the resin substrate and form the radial line pattern 61, for example, the rear face of the resin substrate is formed in a flat shape, and the ink layer is formed to come in contact with the rear face side of the resin substrate. In this case, the ink layer easily absorbs light using a black ink, for example. Thus, the radial line pattern 61 is formed on the dial plate 57 in such a manner that the light incident on the front side of the dial plate 57 is reflected by the plurality of grooves 63 provided on the front face of the resin substrate, and light not reflected by the plurality of grooves 63 are absorbed into a flat surface (a black surface coming in contact with the rear face of the resin substrate) of the ink layer with the black ink.

When the dial plate 57 includes the plurality of grooves 63 that are provided on the rear face of the resin substrate and form the radial line pattern 61, for example, the ink layer is formed to come in contact with the rear face of the resin substrate provided with the plurality of grooves 63. In this case, for example, the front face of the resin substrate is formed in a flat shape, and the ink layer easily reflects light using a reflective ink (mirror ink). Thus, the radial line pattern 61 is formed on the dial plate 57 in such a manner that the light incident on the front side of the dial plate 57 is reflected by the plurality of grooves 63 that are provided on the rear face of the resin substrate and come in contact with the ink layer with the reflective ink at the rear face side. In this case, furthermore, the dial plate 57 may be configured such that a suppression ink layer is further formed to come in contact with the ink layer with the reflective ink, thereby preventing a so-called pin-hole appearance.

In the above description, furthermore, the dial plate 57 is configured in such a manner that the metal thin film 57b is applied to the front face of the resin substrate 57a provided with the grooves 63 in the example of FIG. 4, but the metal thin film 57b may be applied to the rear face of the resin substrate 57a provided with the grooves 63. Even in this case, the radial line pattern 61 is formed in such a manner that the light incident on the front side of the dial plate 57 is reflected by the grooves 63.

In the above description, furthermore, the dial plate 57 is configured such that the plurality of grooves 63 are integrally molded by the molding die or the like on the resin substrate 57a to form the radial line pattern 61, that is, the plurality of grooves 63 are transferred to the resin substrate 57a from the molding die, but is not limited thereto. For example, the dial plate 57 may be configured such that metallic-tone printing is performed on the front face of the resin substrate 57a and the plurality of grooves 63 are printed by the metallic-tone printed ink to form the radial line pattern 61. That is, the dial plate 57 may be configured such that, for example, the ink is printed on the front face of the resin substrate 57a to form a concave-state portion and a convex-state portion in a manner of stacking and curing according to the radial line pattern 61, and the plurality of grooves 63 are formed by the concave-state portion. In this case, the dial plate 57 may be configured such that, for example, a first metallic-tone printed layer is printed on the front face of the resin substrate 57a, a smoke printed layer is printed on the front face of the first metallic-tone printed layer, and a second metallic-tone printed layer having a line width narrower than that of the smoke printed layer is printed on the front face of the smoke printed layer, whereby the plurality of grooves 63 are formed to form the radial line pattern 61. The first metallic-tone printed layer and the second metallic-tone printed layer is made up of a printed layer of a metallic ink using, for example, metal powders such as aluminum powders or bronze powders or a pearl pigment made by coating titanium oxide or iron oxide on mica. An example of the smoke printed layer may include a clear-based paint that is obtained by mixing of a medium, a black ink, and the like and is improved in gloss or transparency or a mat-based paint that is obtained by mixing a matting agent, a black ink, and the like and is reduced in gloss.

Others, the plurality of grooves 63, 77, 79, 81, 89, or 91 for forming the radial line pattern 61 are not limited to the above description, and may be formed by various methods. In addition, the grooves 63, 77, 79, 81, 89, or 91 may be formed, for example, by performing a marking process or the like on the resin substrate 57a and may be drawn by a transparent resin ink. In addition, the dial plate 57, 73, 85, or 95 may be configured to include various protective layers on the front side of the resin substrate 57a.

According to a radial line dial plate and an automobile meter provided with the radial line dial plate of the present invention, a radial line pattern of appearance with comfortable and natural feeling as a metallic-tone dial plate can be stably given.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A device comprising:
an automobile meter comprising a radial line dial plate, the radial line dial plate comprising:
a dial plate made of synthetic resin; and
a shaft through-hole provided in the dial plate and configured to receive a rotation shaft of a meter unit therethrough, wherein
the dial plate is provided with a plurality of grooves that extend radially outward from an opening rim of the shaft through-hole to form a radial line pattern provided on the dial plate, and the plurality of grooves are configured to be provided radially around a position different from a center axis of the shaft through-hole.

2. The device according to claim 1, wherein the plurality of grooves are linear.

3. A device comprising:
an automobile meter comprising a radial line dial plate, the radial line dial plate comprising:
a dial plate made of synthetic resin; and
a shaft through-hole provided in the dial plate and configured to receive a rotation shaft of a meter unit therethrough, wherein
the dial plate is provided with a plurality of grooves that extend outward from an opening rim of the shaft through-hole to form a radial line pattern provided on the dial plate, and at least several grooves of the plurality of grooves are configured to be provided to intersect with other grooves.

4. The device according to claim 3, wherein the plurality of grooves are linear.

5. A device comprising:
an automobile meter comprising a radial line dial plate, the radial line dial plate comprising:
a dial plate made of synthetic resin; and
a shaft through-hole provided in the dial plate and configured to receive a rotation shaft of a meter unit therethrough, wherein
the dial plate is provided with a plurality of grooves that extend outward from an opening rim of the shaft through-hole to form a radial line pattern provided on the dial plate, and the plurality of grooves are configured to include first grooves that are provided radially around a center axis of the shaft through-hole and second grooves that are provided along a straight line not passing through the center axis.

6. The device according to claim 5, wherein the plurality of grooves are linear.

7. A device comprising:
an automobile meter comprising a radial line dial plate, the radial line dial plate comprising:
a dial plate made of synthetic resin; and
a shaft through-hole provided in the dial plate and configured to receive a rotation shaft of a meter unit therethrough, wherein
the dial plate is provided with a plurality of grooves that extend outward from an opening rim of the shaft through-hole to form a radial line pattern provided on the dial plate, and the plurality of grooves are configured to include first grooves that are provided radially around a position different from a center axis of the shaft through-hole and second grooves that are provided along a straight line not passing through the center axis.

8. The device according to claim 7, wherein the plurality of grooves are linear.

* * * * *